United States Patent
Shida et al.

Patent Number: 5,935,532
Date of Patent: Aug. 10, 1999

[54] COMBUSTION GAS EXHAUST DUCT FOR A STEAM REFORMER

[75] Inventors: Hiroya Shida, Nagasaki; Masahiro Hirano, Tokyo, both of Japan

[73] Assignee: Mitsubishi Heavy Industries, Ltd., Tokyo, Japan

[21] Appl. No.: 08/874,483

[22] Filed: Jun. 13, 1997

[30] Foreign Application Priority Data

Jun. 19, 1996 [JP] Japan .................. 8-158160

[51] Int. Cl.$^6$ .................. D03D 15/00
[52] U.S. Cl. .................. 422/197; 422/197; 422/198; 422/202; 422/204; 422/196; 422/209; 422/211; 48/127.3; 48/127.5; 48/127.9
[58] Field of Search .................. 422/197, 198, 422/202, 204, 196, 209, 211; 48/127.3, 127.5, 127.9

[56] References Cited

U.S. PATENT DOCUMENTS

| | | |
|---|---|---|
| 2,028,326 | 1/1936 | Hanks et al. |
| 2,028,328 | 1/1936 | Hanks et al. .................. 422/197 |
| 3,257,172 | 6/1966 | Kao et al. .................. 422/197 |
| 4,405,564 | 9/1983 | Herbort et al. .................. 422/197 |

FOREIGN PATENT DOCUMENTS

195 12 219  4/1996  Germany.

OTHER PUBLICATIONS

Patent Abstracts of Japan, vol. 009, No. 180 (C–293), Jul. 25, 1985 & JP 60 051603 A (Nissan Jidosha KK), Mar. 23, 1985.

*Primary Examiner*—Glenn Caldarola
*Assistant Examiner*—Tung Doan
*Attorney, Agent, or Firm*—Wenderoth, Lind & Ponack, L.L.P.

[57] ABSTRACT

In a combustion gas reformer, exhaust ducts are provided at a lower portion of the reformer. Openings are provided in opposite side walls along the length of each exhaust duct. The openings are uniformly distributed at a constant height along the longitudinal direction of the exhaust duct. The openings are disposed in the side walls at a constant height, and may be arrayed in two steps or rows. A partition wall is provided on the upper wall and extends along the length of the exhaust duct. The amount of combustion gas flowing into the duct through the openings at the lower portion of the side walls increases gradually toward the exhaust outlet. However, since the cross section of the duct toward the outlet becomes gradually enlarged, pressure and gas distribution become uniform. Also, no transverse flow of the combustion gas occurs, due to the partition wall being disposed on the upper wall of the duct.

2 Claims, 5 Drawing Sheets

COMBUSTION GAS EXHAUST DUCT FOR A STEAM REFORMER

BACKGROUND OF THE INVENTION

1. Field of the Invention

The present invention relates to a combustion gas exhaust duct which is an internal construction in a steam reformer, which is used as hydrogen supply equipment for a plant using hydrogen as a raw material.

2. Description of the Prior Art

FIG. 4 is a cross sectional view of a steam reformer, which is known in the prior art. The steam reformer is used as a hydrogen supply for a plant which uses hydrogen as a raw material, such as a methanol production plan, etc. FIG. 5 is a view taken along line C—C of FIG. 4. In FIGS. 4 and 5, numeral 1 designates a first protective heat insulating material, which forms a steam reformer housing 20. Numeral 2 designates a combustion gas exhaust duct. A plurality of gas exhaust ducts 2 are provided in the reformer housing 20. Numeral 3 designates a group of openings, each consisting of a plurality of openings disposed on opposite sides of the exhaust duct 2. Numeral 5 designates a plurality of burners disposed at a top portion of the reformer housing 20, numeral 6 designates a flame, and numeral 7 designates a burner combustion gas. Numeral 10 designates a raw material gas inlet header, numeral 15 designates catalyst tubes, and numeral 11 designates an outlet header. A raw material gas, from inlet header 10, flows through catalyst tubes 15 and into outlet header 11.

As mentioned above, a plurality of the burners 5 are arrayed in rows at the top portion of the reformer housing 20. Each of the burners 5 is surrounded by the fire protective insulating material 1. Catalyst tubes 15 are disposed between the rows of burners 5. A mixture of raw material and steam flows from the raw material gas inlet header 10 through the catalyst tubes 15 and into the outlet header 11. The burner combustion gas 7 is sucked into the exhaust ducts 2 via openings 3, which are provided in the side walls of each of the exhaust ducts 2 and located at a bottom portion of the reformer housing 20. The exhaust ducts are disposed directly under the rows of burners 5. The combustion gas is exhausted outside of the reformer housing 20, as shown by flow 21, at an exhaust gas outlet.

FIG. 6 is a plan view of the exhaust duct 2. FIG. 7, left side, is a view taken on line D—D of FIG. 6, and FIG. 7, right side, is a view taken on line E—E of FIG. 6. As shown in FIG. 7, in order to uniformly distribute an-exhaust volume of burner combustion gas 7, the group of openings 3 disposed in both side walls of the exhaust duct 2 has a gradually reduced number of openings in a direction towards the outlet side of the exhaust duct.

In the prior art steam reformer, it is important that a combustion load be uniform in the plurality of burners. Also, uniformity of the down flow and performance of the burner combustion gas 7 in the reformer is important in order to obtain sufficient uniform heat transfer to the plurality of catalyst tubes. This is especially important for preservation and maintenance of catalysts and the catalyst tubes 15.

Once the steam reformer is put into actual operation, the combustion gas exhaust duct 2 is non-adjustable, and therefore, distribution of the gas exhaust in the exhaust duct 2 must be uniform. However, in the prior art exhaust duct 2, shown in FIGS. 4–7, there is a problem that, in accordance with the quality of distribution of the groups of openings 3, a situation may arise where a gas suction amount is easily biased in the longitudinal direction of the tunnel, or in an exceptional case all of the gas is biased toward the outlet side of the tunnel.

As the amount of gas in the ducts 2 necessarily increases toward the outlet side of each duct 2, it is essential to gradually reduce the number of openings in the side walls as the outlet side is approached. However, it is difficult to determine the proper manner in which to reduce the number of openings. Therefore, biasing of gas continues to be difficult to effectively prevent.

SUMMARY OF THE INVENTION

In order to solve the above-identified problem in the prior art, it is an object of the present invention to provide a combustion gas exhaust duct for a steam reformer in which a distribution of a combustion gas amount is uniform along a longitudinal direction of the exhaust duct, thereby uniformly distributing the heat transferred to a plurality of catalyst tubes.

In order to obtain the object of the present invention, the following are provided.

(1) In the present invention, an improved combustion gas exhaust duct is provided for a steam reformer. Combustion gas is generated in a steam reformer and is used as a hydrogen supply for a plant using hydrogen as a raw material, such as a methanol production plant, etc. The combustion gas exhaust duct has a cross sectional area, in a flow direction of combustion gas through the exhaust duct, which is increased gradually as the combustion gas approaches a gas outlet side of the exhaust duct. A plurality of openings are uniformly distributed with a predetermined spacing along a longitudinal direction of the exhaust duct at lower portions of both side walls of the exhaust duct.

(2) In the present invention, the combustion gas exhaust duct for a steam reformer, as mentioned in (1) above, includes a partition wall, which is provided to prevent transverse flow of gas in the steam reformer housing relative to the flow of gas through the exhaust ducts. The partition wall is located on an outer central portion of an upper wall of the exhaust duct and extends along the longitudinal direction of the exhaust duct.

According to the apparatus of the present invention as described above, the cross sectional area of the exhaust duct is enlarged gradually in accordance with a gas suction amount, thereby flow velocity of gas flowing through the exhaust duct becomes uniform throughout the exhaust duct. That is, static pressure in the exhaust duct becomes uniform. As for the enlarging of the duct, an upper wall of the duct has a stepped configuration, or is inclined toward the exhaust outlet, so as to increase the height of the duct in a direction toward the outlet in accordance with a gas suction amount, for example. Further, the number of openings provided in the lower portions of the exhaust duct side walls, is constant along the longitudinal direction of the duct. Also, the number of openings is determined so that a necessary suction force, i.e. the difference between the static pressure in the reformer and the static pressure in the exhaust duct, is produced. Also, since the openings are provided at the lower portion of the exhaust duct, a contact length or a heat transfer area of the multitude of catalyst tubes and gas can be maximized.

Further, in the apparatus of the present invention, as described in (2) above, a cross section of the exhaust duct is gradually enlarged in a direction towards the duct outlet by increasing the height of the duct cross section in a step-wise manner, or continuously, along the length of the duct. Also, a central partition wall is provided so that the height of the exhaust duct becomes constant so as to compensate for the gradual change in height of the upper wall of the exhaust duct, thereby preventing transverse flow of gas due to the differing heights of the exhaust duct.

Further, although the height of the cross section of the exhaust duct increases in a step-wise fashion, or continuously, in a direction towards the exhaust outlet, a certain number of openings are uniformly distributed at lower portions of both side walls of the exhaust duct.

With the apparatus of the present invention, the following effects are obtained:

(a) Static pressure in the exhaust duct is uniform throughout the length of the duct, and therefore, distribution of the amount of combustion gas which is sucked into the exhaust duct through the openings is uniform along the longitudinal direction of the duct, and thereby heat will be uniformly transferred to the multitude of catalyst tubes.

(b) The partition wall is provided on the upper wall of the exhaust duct in order to prevent transverse gas flow in the reformer, which could be caused by the height differences of the duct. Since transverse gas flow is prevented, uniform gas distribution along the longitudinal direction of the duct is further enhanced.

(c) The openings in each side wall of the exhaust duct are provided at lower portions of the duct, and therefore, the contact length or heat transfer area of the catalyst tubes and the gas can be maximized.

BRIEF DESCRIPTION OF THE DRAWINGS

Other features and objects of the present invention will become apparent from the following detailed description, taken in conjunction with the accompanying drawings, which illustrate, by way of example, the features of the present invention.

DETAILED DESCRIPTION OF THE INVENTION

Figure 1:
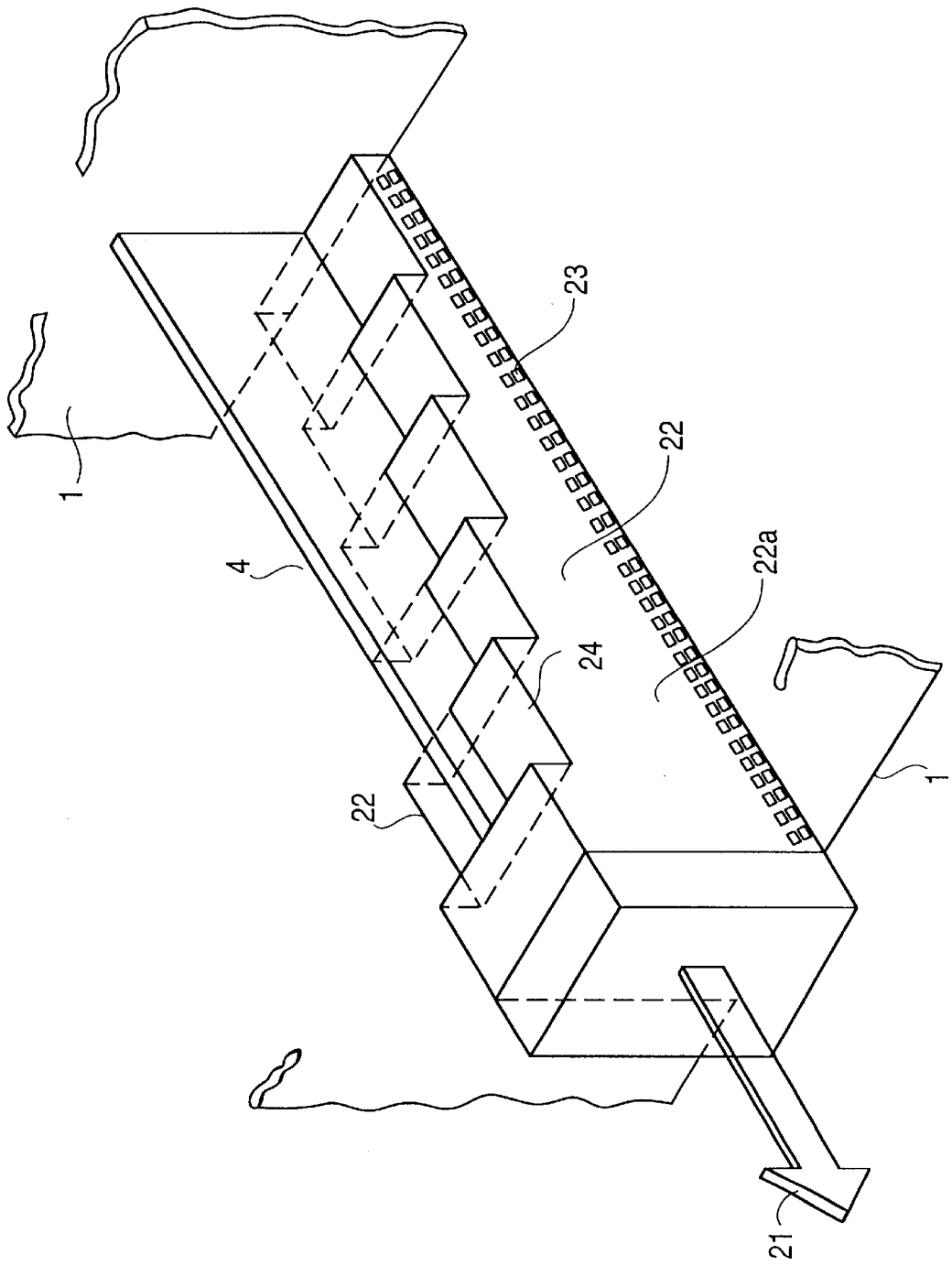
FIG. 1 is a perspective view of a combustion gas exhaust duct for a steam reformer in accordance with an embodiment of the present invention.
Figure 2:
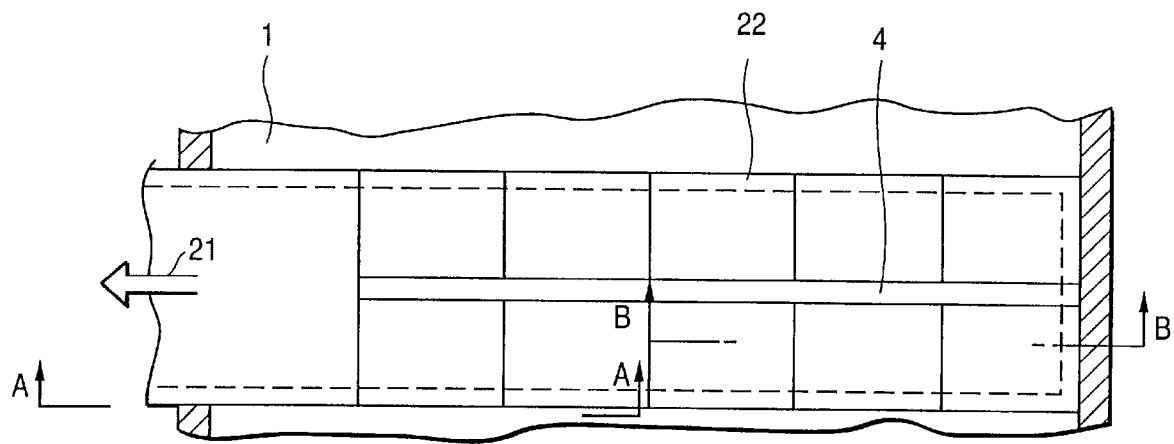
FIG. 2 is a plan view of the combustion gas exhaust duct illustrated in FIG. 1.
Figure 3:
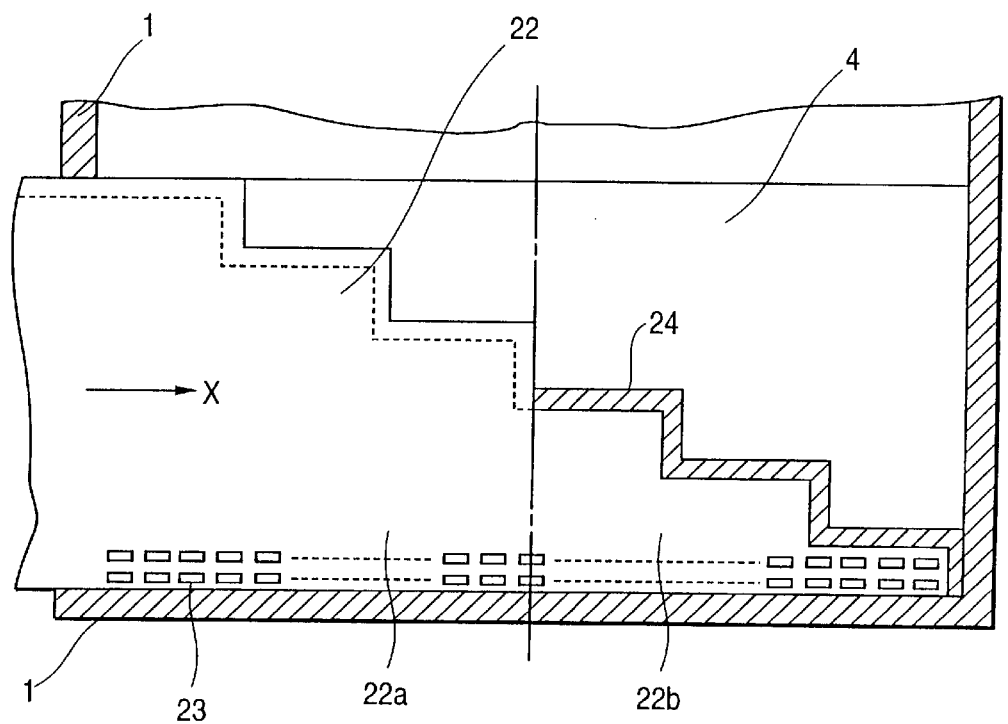
FIG. 3 shows, on the left side of the figure, a view taken along line A—A of FIG. 2 and, on the right side of the figure, a sectional view taken on line B—B of FIG. 2.

Here below, description is made of preferred embodiments according to the present invention with reference to accompanying figures. FIG. 1 is a perspective view of a combustion gas exhaust duct for a steam reformer according to a first embodiment of the present invention. FIG. 2 is a plan view thereof and FIG. 3 is, on the left side, a view taken along line A—A of FIG. 2 and, on the right side, a view taken on line B—B of FIG. 2.

In these figures, numeral 1 designates a reformer housing wall, numeral 22 designates a combustion gas exhaust duct or tunnel surrounded by the reformer housing wall 1, numeral 23 designates openings provided in lower portions of both sides of the exhaust duct 22, numeral 4 designates a partition wall positioned on a central portion of the exhaust duct and extending along the longitudinal direction of the exhaust duct 22, and numeral 21 designates gas flow at an exhaust gas outlet.

Figure 4:
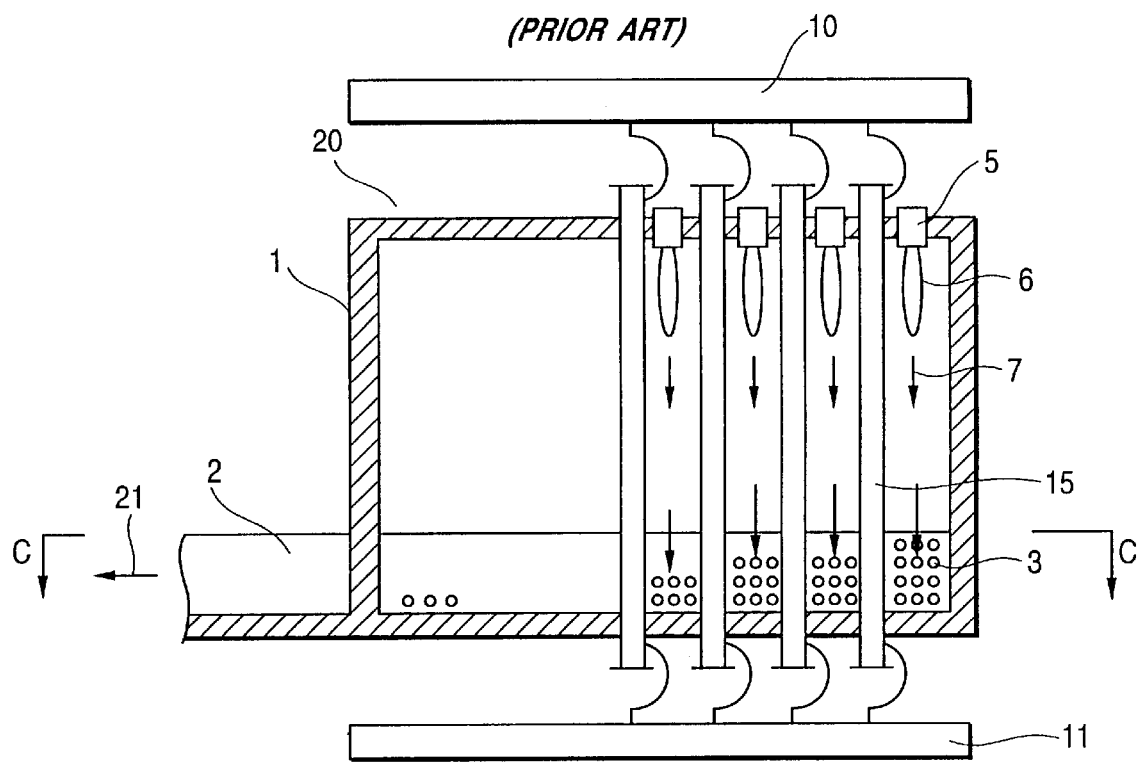
FIG. 4 is a cross sectional view of a prior art steam reformer.
Figure 5:
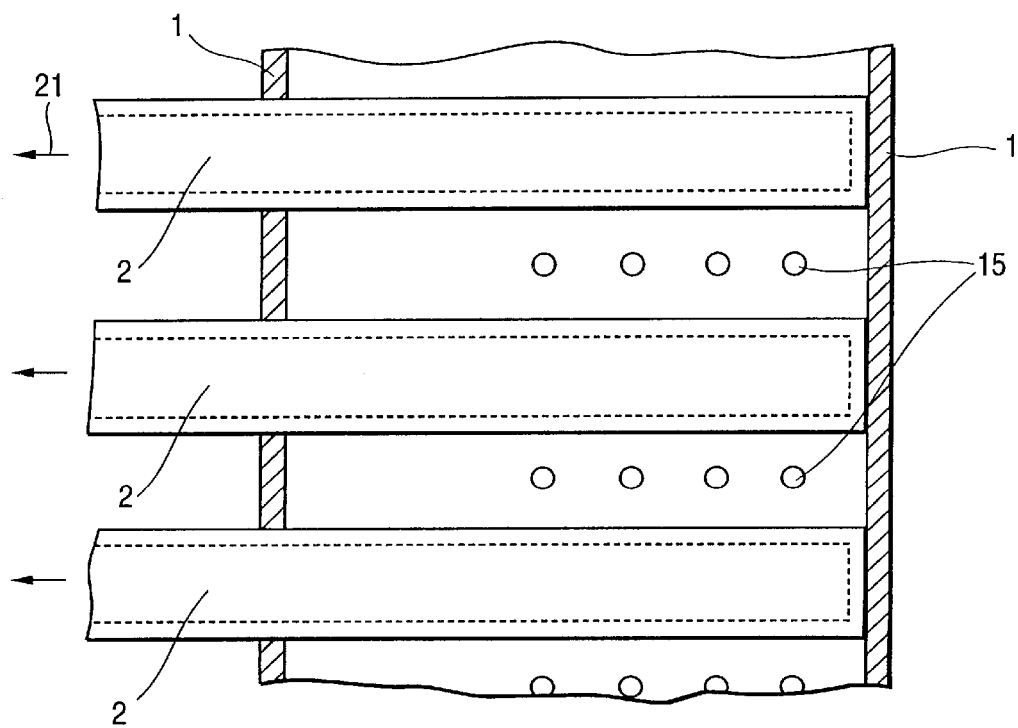
FIG. 5 is a view taken along line C—C of FIG. 4.
Figure 6:
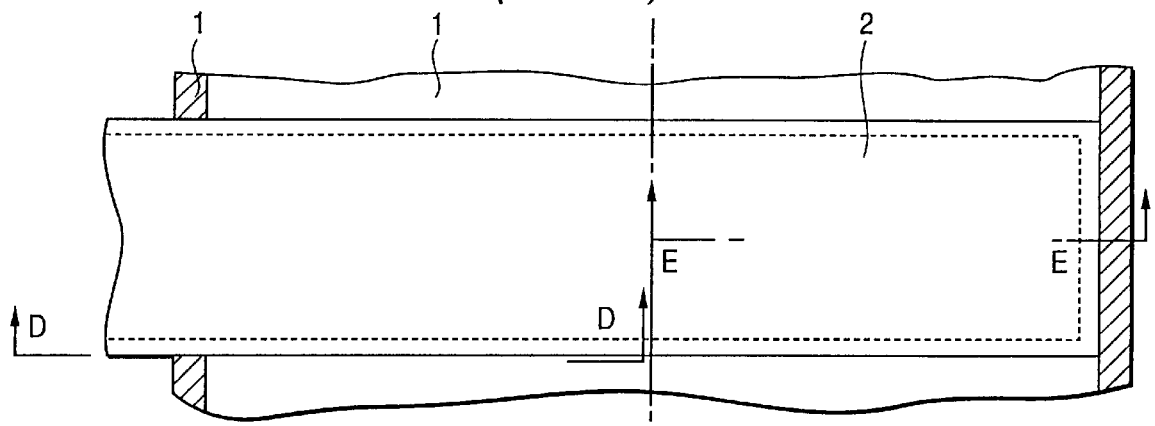
FIG. 6 is a plan view of a prior art combustion gas exhaust duct for a steam reformer.
Figure 7:
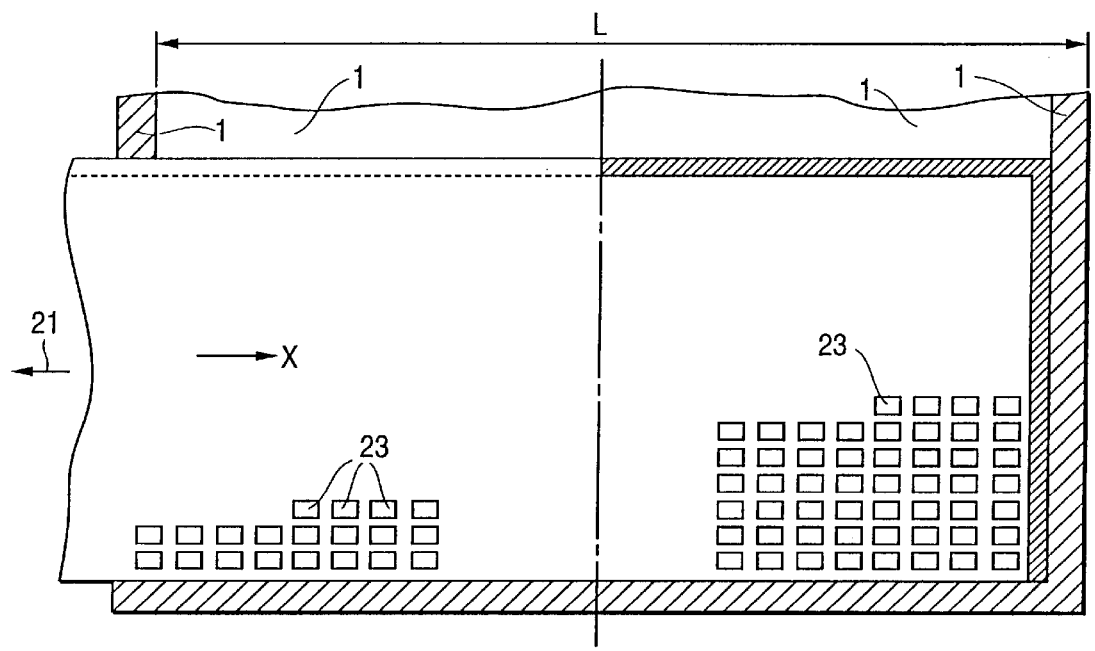
FIG. 7 shows, on the left side of the figure, a view taken along line D—D of FIG. 6 and, on the right side of the figure, a view taken along line E—E of FIG. 6.

The combustion gas exhaust duct 22 is provided on a bottom portion of a reformer 20 such as that shown in prior art FIG. 4. The exhaust duct 22 is constructed with an upper wall 24 which is formed in a "step-wise" manner so that, as shown in FIG. 1, a longitudinal cross sectional area of the exhaust duct 22 is enlarged "step-wise" in a direction toward the exhaust outlet.

The openings 23 in opposing side walls 22a, 22b of the combustion gas exhaust duct 22 are provided in a certain number which remains constant along the longitudinal direction of the exhaust duct 22. For example, as shown in FIG. 1, the openings 23 are arrayed in two rows, which extend in the longitudinal direction of the exhaust duct 22. In contrast to the exhaust duct of the prior art, in the present invention it is not necessary to adjust the number of openings along the length of the duct in order to achieve a uniform static pressure distribution throughout the exhaust duct.

Further, the partition wall 4 is provided on an outer side of the upper wall 24 of the combustion gas exhaust duct 22. The partition wall 4 extends in the longitudinal direction of the combustion gas exhaust duct 22 and has a lower edge, which conforms to the stepped configuration of the outer side of the upper wall 24.

In the embodiment described above, a cross sectional area of the combustion gas exhaust duct or tunnel 22 is enlarged in accordance with the gas suction amount, thereby a flow velocity of gas becomes uniform throughout the length of the tunnel 22. That is, the static pressure in the tunnel 22 becomes uniform.

The openings 23 may be provided in both side walls 22a, 22b of the exhaust duct 22 in a constant number or pattern. Also, the number of openings 23 is determined so that a necessary suction force, i.e. the difference between static pressure in the reformer and static pressure in the exhaust duct, is produced. Also, as the openings 23 are provided at a lower portion of the exhaust duct 22, contact length or a heat transfer area of the plurality of catalyst tubes 15 and the gas is maximized.

Further, by use of the central partition wall 4 for compensating for changes in height of the exhaust duct 22 in the reformer 20, there is no transverse flow of the combustion gas, which would be caused by the differences in height of the exhaust duct 22.

Figure 8:
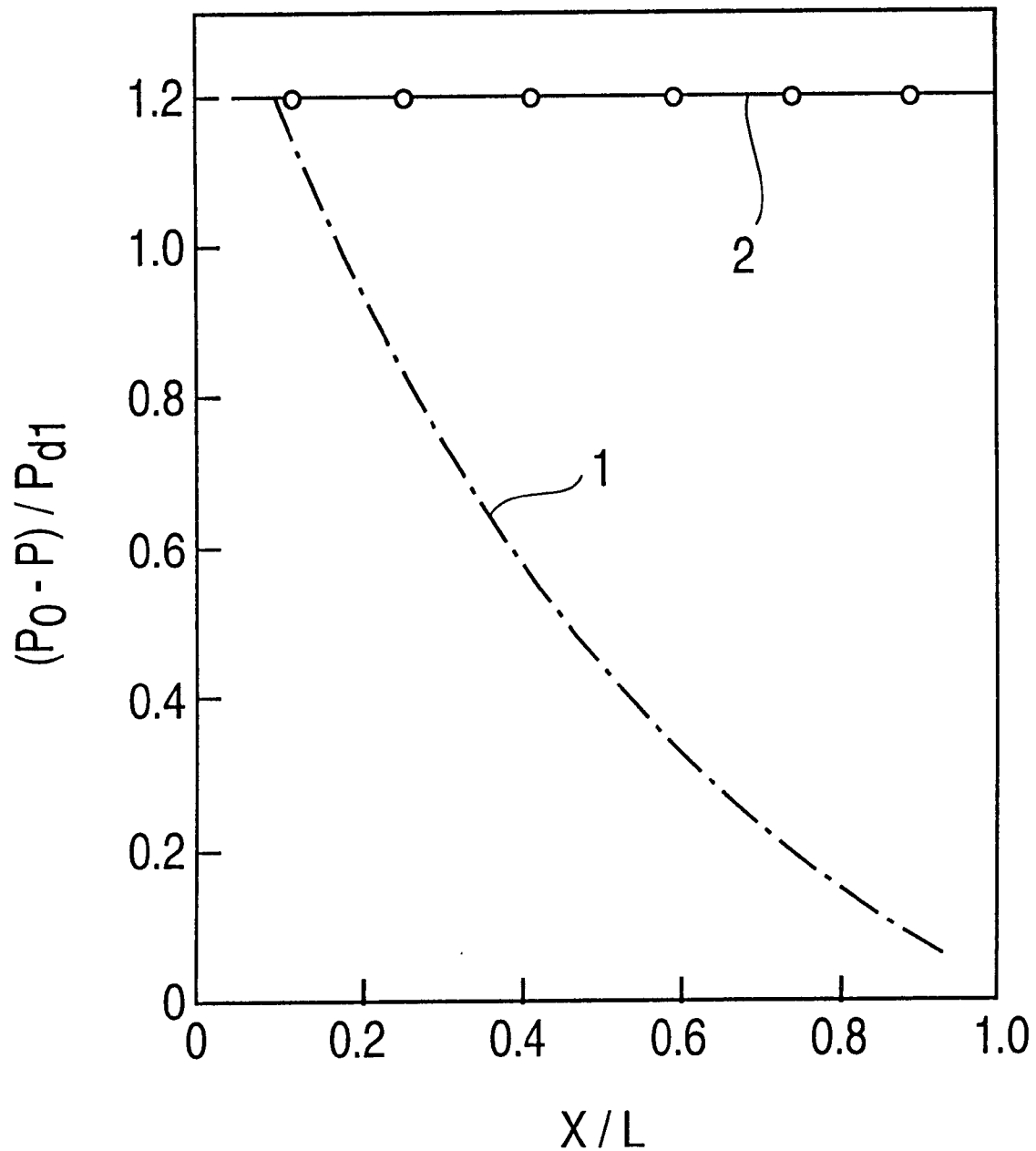
FIG. 8 is a graph showing a static pressure distribution in the steam reformer exhaust duct of the present invention in comparison with a static pressure distribution in a prior art steam reformer exhaust duct.

FIG. 8 is a graph illustrating a comparison of a static pressure distribution in the tunnel of the present invention with that of the prior art. In FIG. 8 changes in the difference between the static pressure in the reformer and that in the exhaust duct 22 are illustrated at different locations along the longitudinal direction of the exhaust duct 22. In the figure, $P_o$ represents static pressure in the reformer, P represents static pressure is the exhaust duct, $P_{d1}$, represents gas dynamic pressure at the exhaust duct outlet, X represents the distance from the exhaust duct outlet, and L represents the entire duct length. Line $\hat{1}$ represents the static pressure distribution in the prior art exhaust duct, and line $\hat{2}$ represents the static pressure distribution in the exhaust duct of the present invention. According to FIG. 8, in the prior art, the static pressure difference (that is, a gas suction force) is large in the vicinity of the exhaust duct outlet 22, and rapidly becomes smaller as the distance from the exhaust duct outlet increases. This is the reason for the biasing of gas as mentioned above. On the other hand, in the present invention, the static pressure difference remains constant along the longitudinal direction of the exhaust duct 22.

While the preferred form of the present invention has been described, variations thereto will be apparent to those skilled in the art within the scope of the present inventive concepts, which are delineated by the following claims.

What is claimed is:

1. A combustion gas exhaust duct for a steam reformer, said combustion gas exhaust duct comprising:

a first side wall;

a second side wall disposed opposite to said first side wall;

a plurality of openings through a lower portion of said first side wall, wherein said plurality of openings are uniformly distributed along a longitudinal direction of said exhaust duct;

a plurality of openings through a lower portion of said second side wall, wherein said plurality of openings are uniformly distributed along the longitudinal direction of said exhaust duct;

an upper wall extending between and connecting said first and second side walls, wherein said first side wall, said second side wall and said upper wall define an exhaust outlet at one end thereof, wherein said upper wall is arranged such that a cross sectional area through said exhaust duct increases in the longitudinal direction toward said exhaust outlet; and a partition wall disposed on an outer central longitudinal portion of said upper wall, wherein a lower edge of said partition wall conforms to said outer central longitudinal portion of said upper wall.

2. A steam reformer comprising:

a reformer housing constructed of a heat insulating material;

a plurality of catalyst tubes vertically arrayed in said reformer housing and extending through an upper wall and a lower wall of said reformer housing;

a gas inlet header connected to said plurality of catalyst tubes;

an outlet header disposed outside of said reformer housing and connected to said catalyst tubes;

a plurality of burners mounted in said upper wall of said housing; and a plurality of combustion gas exhaust ducts, located on said lower wall of said reformer housing, each of said plurality of combustion gas exhaust ducts including:

a first side wall;

a second side wall disposed opposite to said first side wall;

a plurality of openings through a lower portion of said first side wall, wherein said plurality of openings are uniformly distributed along a longitudinal direction of said exhaust duct;

a plurality of openings through a lower portion of said second side wall, wherein said plurality of openings are uniformly distributed along the longitudinal direction of said exhaust duct;

an upper wall extending between and connecting said first and second side walls, wherein said first side wall, said second side wall and said upper wall define an exhaust outlet at one end thereof, wherein said upper wall is arranged such that a cross sectional area through said exhaust duct increases in the longitudinal direction toward said exhaust outlet; and a partition wall disposed on an outer central longitudinal portion of said upper wall of each of said plurality of exhaust ducts for preventing transverse flow of a gas between said first and second sides of each of said exhaust ducts.

\* \* \* \* \*